(12) United States Patent
Lindström (10) Patent No.: US 11,691,848 B2
(45) Date of Patent: Jul. 4, 2023

(54) SAFELY BRAKE FOR AN ELEVATOR

(71) Applicant: Alimak Group Sweden AB, Skellefteå (SE)

(72) Inventor: Henrik Lindström, Bureå (SE)

(73) Assignee: Alimak Group Sweden AB, Skellefteå (SE)

( * ) Notice: Subject to any disclaimer, the term of this patent is extended or adjusted under 35 U.S.C. 154(b) by 531 days.

(21) Appl. No.: 16/645,396

(22) PCT Filed: Aug. 16, 2018

(86) PCT No.: PCT/SE2018/050832
§ 371 (c)(1),
(2) Date: Mar. 6, 2020

(87) PCT Pub. No.: WO2019/050447
PCT Pub. Date: Mar. 14, 2019

(65) Prior Publication Data
US 2020/0283267 A1    Sep. 10, 2020

(30) Foreign Application Priority Data

Sep. 7, 2017   (SE) .................................... 1751083-5

(51) Int. Cl.
 *B66B 5/22* (2006.01)
 *B66B 5/04* (2006.01)
 (Continued)

(52) U.S. Cl.
 CPC ................ *B66B 5/22* (2013.01); *B66B 5/044* (2013.01); *B66D 5/04* (2013.01); *B66D 5/14* (2013.01);
 (Continued)

(58) Field of Classification Search
 CPC .. B66B 5/22; B66B 5/044; B66D 5/04; B66D 5/14; F16D 59/00; F16D 2121/14; F16D 2125/40
 See application file for complete search history.

(56) References Cited

U.S. PATENT DOCUMENTS 3,415,343 A * 12/1968 Svensson ................ B66B 5/044
                                              187/270
4,258,832 A *  3/1981 Thorp ....................... B66D 5/14
                                              188/184
(Continued)

FOREIGN PATENT DOCUMENTS

CH           645702 A5    10/1984
CN         102303801 B     4/2014
(Continued)

OTHER PUBLICATIONS

International Search Report and Written Opinion Received for PCT Application No. PCT/SE2018/050832, dated Nov. 13, 2018, 14 pages.

*Primary Examiner* — Thomas W Irvin
(74) *Attorney, Agent, or Firm* — Morrison & Foerster LLP (57) ABSTRACT

The invention relates to a safety brake for an elevator, a centrifugal regulator and a way of using this in a safety brake. According to the invention, the safety brake comprises a centrifugal regulator (3), a shaft (4), which rotates due to a coupling (5) to the elevator, a first (6) and a second (8) brake part movable against each other with friction surfaces (10, 11), the first brake part being rotatable with the shaft, a spring assembly (30) with which the brake parts are spring-biased with a pressure force, on release the centrifugal regulator is provided to couple the shaft (4) to the first brake part (6) to force rotation on it. The safety brake is self-regulating by comprising the pressure-relieving (Continued)

arrangement provided, due to the rotation of the shaft (4), to relieve the spring biasing by pressing the first brake part (6) towards the spring assembly's (30) spring action and thus from the other brake part (8), until a balanced position is obtained whereby both brake parts (6, 8) frictionally slide against each other.

15 Claims, 4 Drawing Sheets

(51) Int. Cl.
*B66D 5/04* (2006.01)
*B66D 5/14* (2006.01)
*F16D 59/00* (2006.01)
*F16D 121/14* (2012.01)
*F16D 125/40* (2012.01)

(52) U.S. Cl.
CPC .......... *F16D 59/00* (2013.01); *F16D 2121/14* (2013.01); *F16D 2125/40* (2013.01)

(56) References Cited

U.S. PATENT DOCUMENTS 5,904,229 A * 5/1999 Timari ...................... B66B 5/04
187/373
2014/0151158 A1 6/2014 Olsson

FOREIGN PATENT DOCUMENTS

DE 2753079 A1 5/1979
FR 2409953 A1 6/1979
SE 433485 B 5/1984

* cited by examiner

SAFELY BRAKE FOR AN ELEVATOR

CROSS REFERENCE TO RELATED APPLICATIONS

This application is a national stage application under 35 U.S.C. § 371 of International Application No. PCT/SE2018/050832, filed internationally on Aug. 16, 2018, which claims priority to SE 1751083-5, filed Sep. 7, 2017.

The present invention relates to a safety brake for an elevator according to the preamble to claim 1. The invention also relates to a centrifugal regulator intended to be used for a safety brake according to the preamble to claim 11. The invention moreover relates to a way of using a centrifugal regulator according to claim 14.

For security reasons, elevators where an elevator car is moved vertically along a slide or guide are equipped with a safety brake. The safety brake is constructed to be activated if an elevator car exceeds a pre-determined speed and is provided to catch and stop the elevator car within a certain movement distance. Commonly known safety brakes include a fixed and a rotatable brake part having conical axially joinable friction surfaces, a spring assembly as well as a centrifugal regulator with a shaft that rotates due to a coupling to the movement of the elevator car.

When exceeding a pre-determined rotation speed, the centrifugal regulator is provided to activate and couple in a rotation brake. When activated, one or a plurality of centrifugal bodies on the regulator shaft are engaging with an interior side of the rotatable brake part. In this way, the said rotatable brake part is entrained in the rotation of the regulator shaft, whereby a sleeve is caused to bias a spring assembly by travelling along a shaft. As the spring assembly is biased, the rotatable and the fixed brake part are squeezed increasingly harder together, wherein the braking moment M (Nm) increases. The rotation brake is usually provided so that at a successively, i.e. progressively increasing, braking moment, the shaft and thereby the elevator car brake.

The progressively operative brake force and hence the braking moment can theoretically increase up to the maximum force that the system can withstand. If the elevator car still does not stop, the brake force finally increases to a value: Fmax, wherein in certain cases such strong forces and moments can occur that the safety brake is deformed or collapses. The braking distance that this type of progressively operative safety brake can withstand is thus limited. The theoretically longest braking or catch distance, which is determined by how fast the brake force increases, is a factor that from a strength point of view must be considered when the safety brake is dimensioned. A disadvantage of a progressively operative safety brake is thus that it is not possible to predict precisely which forces will occur in the event that it is activated.

When calculating braking moment M for a safety brake for an elevator, maximum and minimum limits for retardation are established. A suitable retardation area could e.g. be 1.5-2.5 m/s$^2$. The brake force Fr is calculated by multiplying the friction number or the friction coefficient μ by the contact force, if Ff and N are the friction force and the normal force, respectively, the following applies: Fr=μ*N, where p is the friction number.

A problem with progressively operative brake devices is that the apparatus must be dimensioned, e.g. over-dimensioned with such a large safety margin that it can withstand the forces that might occur in an extreme case. This over-dimension clearly increases both the weight of the apparatus and its costs.

To be able to predict and calculate more precisely the forces and moments that occur in the braking of elevator cars, it is therefore desired to apply a safety brake with substantially constant braking moment M during the entire braking process, a so-called constantly operative safety brake. Since the braking moment M is constant, this type of safety brake lacks maximum braking distance and therefore that the forces that occur in the braking apparatus during braking can be considered to be constant. A disadvantage of this type of constantly operative safety brakes has so far been that it does not provide safety in case of reduced braking friction, e.g. when moisture or oil occurs on the brake lining. It will be understood that for a progressively operative safety brake, loss of braking friction usually does not constitute a problem because it compensates for reduced braking friction when the driving force of the frictional parts is continuously increased and hence also the developed brake force and the braking moment.

An object of the present invention is therefore to establish a constantly operative safety brake, which is self-regulating, i.e. a safety brake intended to brake with a constant braking moment M, but which does not have the problems mentioned above. More specifically, the aim is a safe and reliable safety brake, which can stop an elevator with a constant pre-determined braking moment, also in the event that the braking friction is reduced.

Another object of the invention is to provide a centrifugal regulator that can be used for a safety brake. A third object of the invention is to propose a way of using a centrifugal regulator.

These objects of the invention are resolved by a safety brake, which obtains the features and characteristics stated in claim 1. The invention also relates to a centrifugal regulator, which obtains the features stated in claim 11 as well as a way of using a centrifugal regulator according to the invention according to claim 14.

The insight that forms the basis of the invention is to advantage a centrifugal regulator in a safety brake, such as a direct part for adaptation of the safety brake to braking through the effect of a rotatable braking part, which is comprised in the brake of the safety brake. Via a hub, the centrifugal regulator is coupled to the shaft and arranged to rotate with the shaft when the elevator moves. In the hub, a switch mechanism is provided to cause the hub and thereby also the centrifugal regulator to perform a translation movement along the center-line of the shaft when one or a plurality of the sling bodies partaking in the centrifugal regulator enter into torque-transmitting engagement with the rotatable brake part.

To obtain a constantly operative safety brake, which is self-regulating, e.g. against suddenly occurring friction loss, a brake whose brake parts are spring-biased against each other with a pre-determined pressure force is utilised. The centrifugal regulator thereby forms a pressure-relieving device provided to relieve the said spring biasing due to the rotation of the shaft through the action of the switch mechanism translating along the longitudinal direction of the shaft and thereby pushing the rotatable brake part against the spring biasing. Depending on the existing operating conditions and the momentarily emerging friction coefficient between the friction surfaces of the cooperating brake parts in the safety brake, a balanced position is hereby obtained, wherein both brake parts frictionally slide against each other, and the brake action occurs. The lasting spring biasing at which the balanced position is obtained will vary via the switch mechanism of the centrifugal regulator, depending on the momentarily applicable operating conditions.

If the friction coefficient is relatively small, the balanced position is obtained as a result of the rotation of the shaft at a previous state, and thus at an existing comparatively high spring biasing, and conversely, if the friction coefficient is relatively high, a balanced position is obtained at a later stage, i.e. after a significant relieving of the pressure and thus a relatively low residual spring biasing. The brake force Fr is calculated as the product of the friction coefficient μ and the contact force remains substantially constant in both cases.

In the following, the invention is described in more detail based on an exemplary embodiment, shown in the accompanying drawing, wherein.

Elevator constructions where an elevator car is transferred vertically along a slide or guide are for safety reasons equipped with a safety brake constructed to be activated and stop the elevator car if it exceeds a pre-determined speed.

Figure 1:
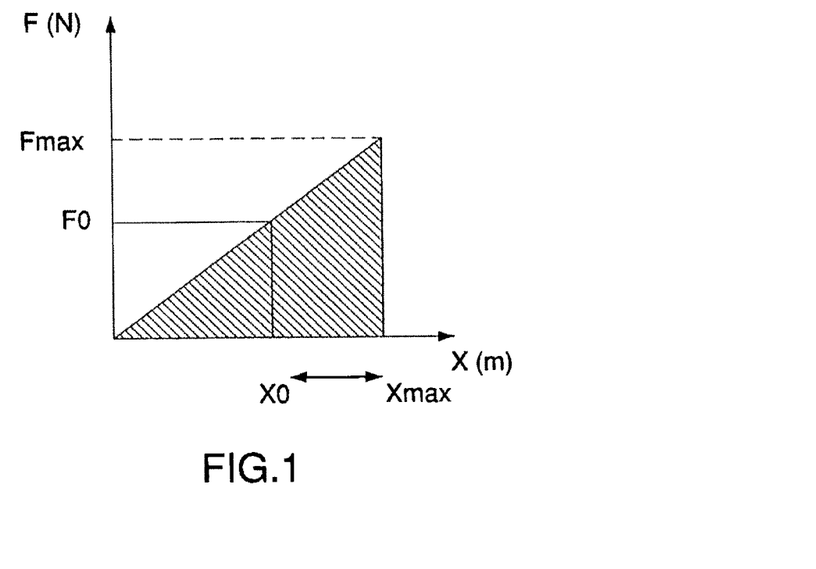
FIG. 1 shows a diagram with a chart illustrating the brake force that occurs along a brake distance for a progressively operative safety brake of an elevator.

FIG. 1 shows a diagram with a chart illustrating the force distribution for braking an elevator car with a known progressively operative safety brake.

The brake force that the safety brake initially starts at when it is activated is designated F0. During the brake distance from X0, the brake force is increased continuously until the elevator car stops. Fmax designates the maximum brake force that the safety brake is, from a strength point, calculated to withstand with a certain safety margin. If the elevator car does not stop, the brake force will continue to increase to the maximum permitted brake force Fmax and further, whereby the safety brake risks being deformed or collapsing entirely.

Figure 2:
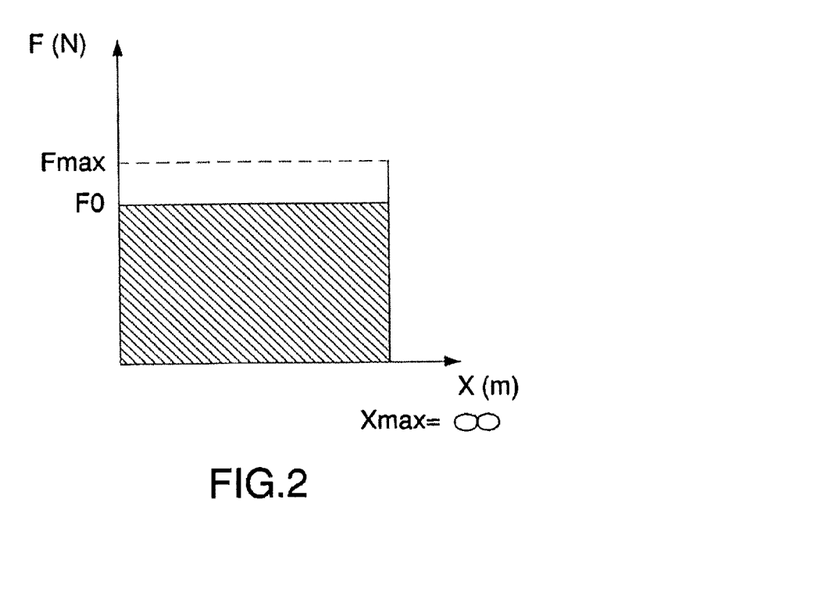
FIG. 2 shows a diagram with a chart illustrating the brake force that occurs along a brake distance for a constantly operative safety brake of an elevator.

FIG. 2 shows a diagram with a chart illustrating the force distribution for braking an elevator car with a known constantly operative safety brake. The brake force that the safety brake initially starts at when it is activated is designated F0. During the brake distance designated X, the brake force is constant until the elevator car stops. Fmax designates the maximum brake force that the safety brake is, from a strength point, calculated to withstand at a certain safety margin. This type of safety brake does not have a maximum theoretical brake distance. As the brake force throughout the entire braking process is below the maximum permitted brake force Fmax, the risk of collapse of the safety brake is minimised.

FIGS. 3-7 show a safety brake generally designated 1 in a first embodiment according to the present invention. The safety brake described in the following is provided to be used for a rack-and-pinion elevator, but the invention as such is clearly not limited to this, rather it is also applicable for any known elevator where an elevator car is transferred vertically along a slide or a guide.

The safety brake 1 has a housing 2, which surrounds a centrifugal regulator 3 with a shaft 4 that rotates due to a coupling 5 to an elevator car (not shown) following its movements. In this exemplary embodiment, the said coupling 5 comprises a gear intended to engage with a gear rack (not shown).

The safety brake 1 comprises a first 6 and a second brake part 8, consisting of an inner and outer part concentrically engaged in each other. The shaft 4 extends concentrically through the assembly that is formed by both brake parts, where the first brake part 6 is surrounded by the second brake part 8. Both brake parts' 6, 8 friction surfaces 10, 11 facing each other are made up of conic portions. The conic portions 10, 11 facing each other are located on an end, facing from the coupling 5, of brake part 6, 8, respectively, and are provided with friction lining for efficient braking process in case of axial initiation of the brake parts.

The first brake part 6 forms a so-called rotor for the brake and is rotatable and axially displaceable journalled for movement towards respectively from the second brake part 8. The second brake part 8 forms a so-called stator for the brake, wherein it is locked against rotation but can, in an embodiment of the invention, be axially displaceable journalled for movement towards respectively from the first brake part 6. The brake parts' 6, 8 degrees of freedom of movement are illustrated with arrows in FIG. 7.

Figure 3:
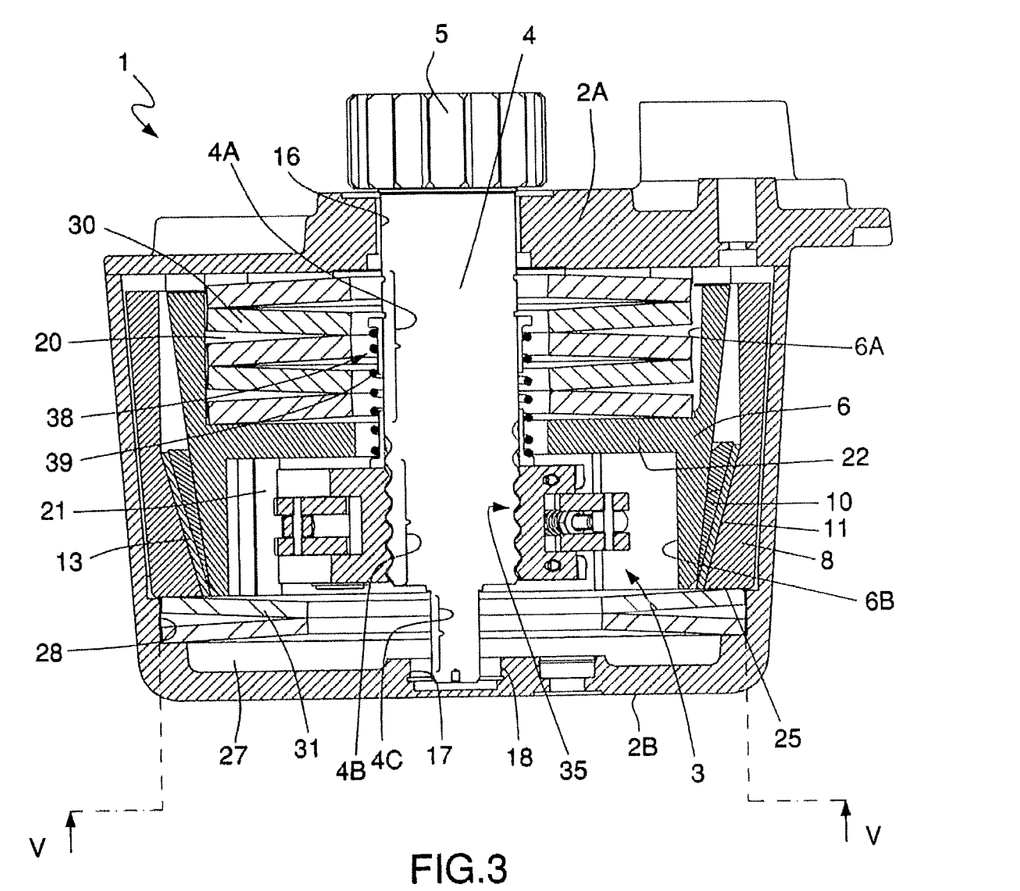
FIG. 3 shows a longitudinal sectional view of a safety brake according to the present invention in a first embodiment and viewed along line III-III in FIG. 5.
Figure 7:
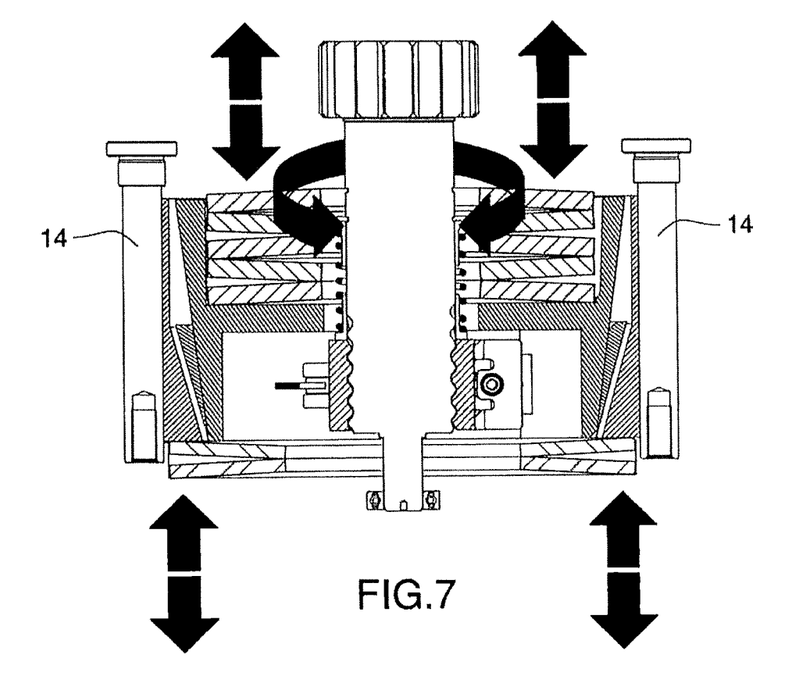
FIG. 7 shows a longitudinal sectional view seen along line VII-VII in FIG. 6, and with arrows illustrating the mutual degrees of freedom of movement for the partaking brake parts.

As will appear from FIGS. 3 and 7, the first 6 and the second 8 brake part, respectively, are axially displaceably journalled on guides 13, 14 in such a way that their effective friction surfaces 10, 11 can move relative to each other when the brake parts are shifted in the direction of the shaft towards respectively from each other. It should be noted that the first brake part 6 is simply guided on the shaft 4 and in the second brake part 8. The centrifugal regulator's 3 shaft 4 extends from the coupling 5 viewed through an opening 16 in the center of a first end wall 2A and after passing the brake assembly further into a circular notch 17 in an opposite second end wall 2B. Both these end walls 2A, 2B form a respective gable section of the safety brake housing 2 and in which gable sections a respective end of the shaft 4 is rotatably journalled. Viewed from the coupling 5, the shaft 4 comprises along its length a first and a second substantially cylindrical outer surface 4A, 4B each of which constitutes substantial parts of the total length of the shaft in the direction of the shaft. The end of the shaft 4 facing away from the coupling 5 is substantially reduced in diameter and is transferred after a shoulder in an end portion, which forms a third cylindrical outer surface 4C. In the shaft end a groove ball bearing is mounted and fitted into a corresponding base 18 in the second end wall 2B of the housing 2

The first brake part 6 has a circular first inner surface 6A, which along with the first cylindrical outer surface 4A of the shaft 4 delimits a first annular space 20. Correspondingly, a second annular space 21 is delimited between a circular second inner surface 6B of the first brake part 6 and the second cylindrical outer surface 4B of the shaft 4.

The first brake part 6 is viewed in the shaft direction, at its approximate middle, provided with an inner transverse wall 22, which, extending a portion radially from the said brake part and further towards the shaft 4, delimits the said first and second annular spaces 20, 21 axially from each other. This radial transverse wall 22 forms a force-transmitting impact for the invention, the function of which will be explained in more detail below.

The second brake part 8 is ended by a transverse end portion 25 towards the central shaft direction, which is facing a third annular space 27, in which the said second annular 21 space is transferred, and which third space in the shaft direction is ended by the second end wall 2B of the housing 2. This third annular space 27 is in radial joints somewhat more extended than both aforementioned and is hereby delimited between the shaft's 4 diameter-reduced third cylindrical outer surface 4C and an encountering circumferential constituent inner surface 28 in the housing 2 of the safety brake 1. The end portion 25 of the second brake part 8 forms a transverse impact surface towards the shaft direction and aforementioned third space 27.

A first spring assembly 30, which surrounds the shaft 4 is included in the first annular space 20 and arranged to operate, by spring force, between the first gable wall 2A of the housing 2 and the said radial inner transverse wall 22 of the first brake part 6. A second spring assembly 31, surrounding the shaft 4 at the diameter-wise relatively narrower third portion, is received in the third annular space 27. The said second spring assembly 31 is arranged so that, with spring force, it is operating in the shaft direction between the housing's 2 second gable wall 2B and the second brake part 8 of the impact surface 25 defined by the end portion. The aforementioned spring assemblies 30, 31 are of the disc spring type.

It should be understood that by way of the action of both spring assemblies 30, 31, the brake parts' 6, 8 friction surfaces 10, 11 are spring-biased with a certain pressure force against each other, allowing both brake parts to transfer a friction moment and thereby also a braking moment M between them. The spring force in the first spring assembly 30, which impacts the first brake part 6 located closest to the coupling 5, is in this exemplary embodiment more than twice as high as the spring force in the second spring assembly 31, which in opposite axial direction impacts on the second brake part 8.

The centrifugal regulator 3 is received in the second annular space 21, described above, of the safety brake 1, i.e. between both spring assemblies 30, 31, in which it has been arranged to form a pressure-relieving device with the purpose of, due to the rotation of the shaft 4, relieving the said spring biasing by way of it, as it rotates with the shaft being coupled to engagement with the first brake part 6, pressing this against the first spring assembly's 30 spring action and hence in direction from the second brake part 8, until a balanced position is obtained. This means that the pressure in the spring assembly 31 decreases, while the pressure in the spring assembly 30 increases.

Figure 4:
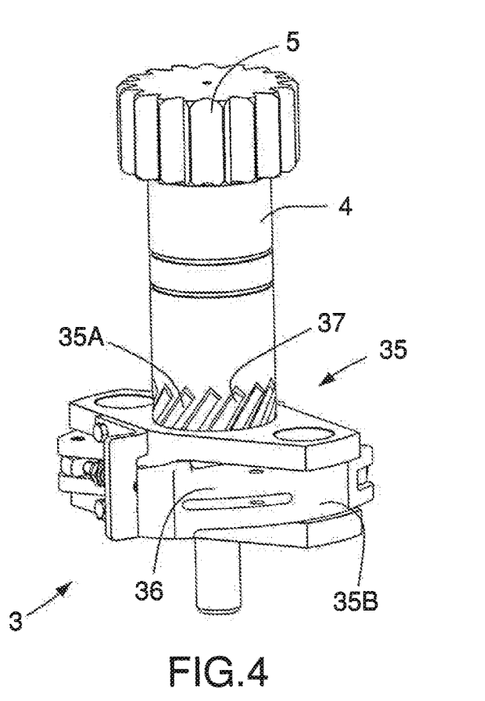
FIG. 4 shows a perspective view of a shaft, which rotates due to a coupling to the movement of the elevator and connected to a centrifugal regulator provided to also have a pressure-relieving effect on a spring biasing according to the present invention.
Figure 5:
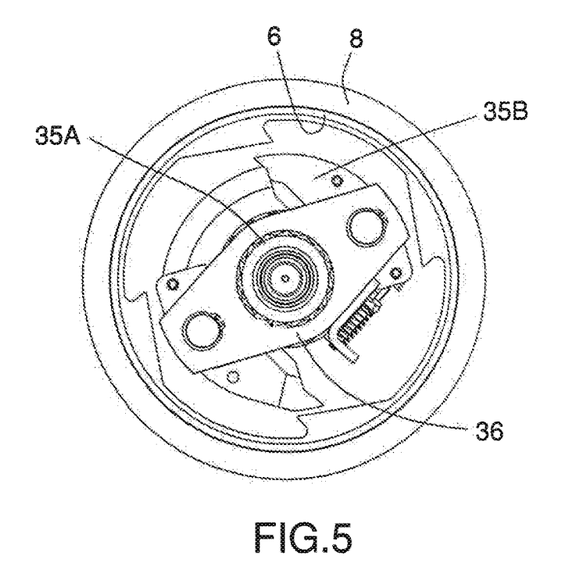
FIG. 5 shows a cross sectional view along line V-V in FIG. 3.
Figure 6:
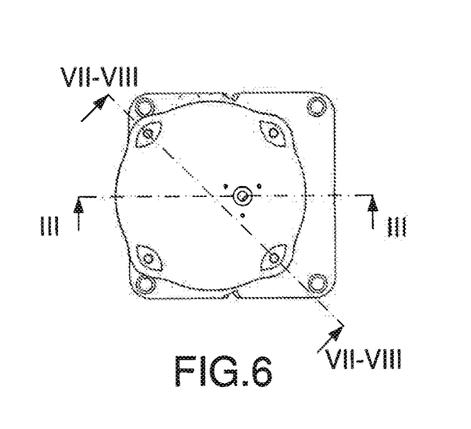
FIG. 6 shows a view from above of a safety brake according to the invention.

FIGS. 4 and 5 show how the centrifugal regulator 3, to be able to accomplish this pressure-relieving function, comprises a torque-transmitting unit that can also bring about translation movement along the center-line of the shaft 4 by way of the action of a switch mechanism generally designated 35. This switch mechanism comprises two torque-transmitting elements of which a first element 35A, during load resulting from a torque on the second element 35B, is affected by both an axial force and a torque. The switch mechanism's 35 first torque-transmitting element 35A comprises a screw-nut-based linear actuator, wherein a threaded nut or sleeve forms part of a hub 36 constituent in the centrifugal regulator, which sliding bearing surrounds the shaft 4, and wherein the screw serving as spindle with large gradient is provided as one or a plurality in series on the shaft's 4 outer surface helically travelling tracks 37 or splines.

The switch mechanism's 35 second torque-transmitting element 35B comprises one or a plurality of sling bodies constituent in the centrifugal regulator and which can be slung to engagement with an interior side of the first brake part 6 facing the shaft. Owing to the combined configuration, the centrifugal regulator 3, according to the invention, can also carry out translation movements along the center-line of the shaft 4.

For the catch apparatus 1 to function in a stable way in its non-activated normal state, i.e. to avoid a circumstance where the centrifugal regulator 3 can "bounce" or in similar ways lead to unwanted movements on the shaft 4 via the screw-nut connection, the safety brake is provided with a spring biasing 38. This spring biasing 38 comprises a spring 39, which, surrounding the shaft 4, is arranged to function between an abutment 40, comprising a ring engaging with a radial track in the shaft, and the centrifugal regulator hub 36, to thereby exert a force on the centrifugal regulator 3 in direction from the shoulder of the first brake part 6, a force against which the centrifugal regulator acts when it translates along the shaft 4.

It has been found that the safety brake's transition from the brake parts' axially initiated state with spring biasing to the balanced position may happen in a gentler and more controlled manner in the embodiment described above, wherein the second brake part 8 is spring-biased and axially displaceably journalled for movement towards and from the first brake part 6, respectively.

Figure 8:
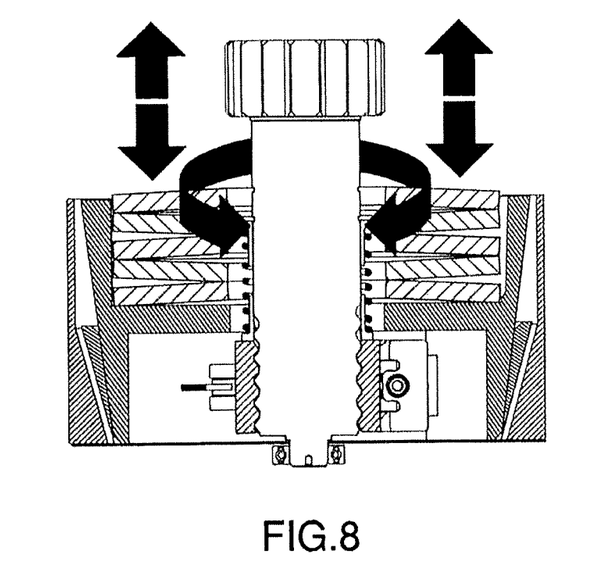
FIG. 8 shows a longitudinal sectional view of a safety brake according to the present invention in an alternative further embodiment, seen along line VIII-VIII in FIG. 6, and with arrows illustrating the mutual degrees of freedom of movement for the partaking brake parts.

FIG. 8 shows the present safety brake in an alternative embodiment, wherein the said second brake part 8 forms a so-called stator for the brake, in which it is substantially fixed and locked against movements. That the second brake part 8 is statically fixed should in no uncertain manner appear from the arrows in FIG. 8 compared with the arrows in FIG. 7.

The safety brake functions in the following way:

In a normal state, the first 6 and the second brake parts' 8 friction surfaces 10, 11 are spring-biased towards each other at a pre-determined pressure force. The shaft 4 wherein the rotation movement is bound to the movement of the elevator car is decoupled from the brake, whereby the shaft may rotate freely.

With the release of the centrifugal regulator 3 co-rotating with the shaft 4, the first brake part 6 of the brake is coupled to the pressure-relieving device comprising the switch mechanism 35 and a torque is thus forced upon it, the size of which may vary depending partly on the system's selected geometry and partly on the momentarily occurring friction. Geometrically, the safety brake is configured with a rapid "ramping up" of generated brake force on release, so that the brake force rises rapidly and the needed braking moment M thereby occurs.

By way of the action of the switch mechanism's 35 torque-transmitting first and second element 35A, 35B, i.e. in this exemplary embodiment the screw-nut-based linear actuator in the centrifugal regulator's hub 36, part of the occurring torque is converted into translation movement, in which the centrifugal regulator is forced to move lengthwise 37 along the shaft's 4 center-line in the direction towards the stop device 22, whereby the first brake part 6 is pressed back against the first spring's 30 spring action. As a result, the spring biasing affecting the brake parts 6, 8 is reduced and so is also the friction force Fr between the brake parts' 6, 8 opposing friction surfaces 10, 11. This means that the force from the spring assembly 31 is reduced, while the force from the spring assembly 30 increases. In this way, a balanced position is obtained whereby both brake parts 6, 8 begin to frictionally slide against each other. The pressure force recommended for the brake function at the obtained balanced position is primarily determined by the occurring operating preconditions, geometric conditions and the occurring friction coefficient μ between the brake parts' 6, 8 friction surfaces 10, 11.

It will be understood that in the event of the friction coefficient μ suddenly becoming significantly lower than expected, the balanced position will be obtained at an earlier stage during the centrifugal regulator's 3 movement along the shaft's 4 center-line towards the stop device 22. The balanced position being obtained at an earlier stage means that the force normal against the friction surface is maintained to a higher degree, which in turn means that the braking moment M (Nm) is substantially maintained or only reduced insignificantly compared with its pre-determined value independently of the friction number.

In this way, the safety brake compensates not only for the occurring friction differences, but also for operating conditions otherwise, such as the momentary load acting on the safety brake, and aims at the safety brake in such a manner that a pre-determined friction moment is always achieved.

It will be understood that the phrase "friction surface" or actually cooperating friction surfaces as it is used above, is to be understood in its widest sense and is clearly intended to comprise any type of friction surface, which is known to a skilled person, irrespective of the selected geometric form. Without deviating from the idea of the invention, for instance gill-shaped brake surfaces could be used.

The invention is not limited to the description above and what is shown in the drawings, but can be amended and modified in a number of different ways within the framework of the intention of the inventive idea set forth in the following claims.

The invention claimed is:

1. A safety brake for an elevator, comprising
    a centrifugal regulator,
    a shaft, which rotates due to a coupling to the movement of the elevator,
    a brake having a first and a second brake part with friction surfaces facing each other, wherein said first brake part can move towards the second brake part, whereby the first brake part is rotatable with the shaft, and in a normal state is decoupled therefrom,
    a first spring assembly through the action of which the brake parts are spring-biased against each other with a certain pressure force, whereby the centrifugal regulator on release is arranged to couple the shaft to the first brake part to force a rotation thereon, wherein the safety brake comprises
    a pressure-relieving device provided to ease the said spring biasing, due to the rotation of the shaft, at the coupled shaft, by the centrifugal regulator and
    a switch mechanism acting between the centrifugal regulator and the shaft, which switch mechanism converts a torque in the switch mechanism into a translation movement moving the centrifugal regulator along the center-line of the shaft, to press the first brake part against the spring assembly's spring action moving the first brake part away from the second brake part, until a balanced position is obtained, whereby both brake parts frictionally slide against each other.

2. The safety brake according to claim 1, wherein the switch mechanism is constituted by two interacting torque-transmitting elements of which a first element is, during load caused by a torque on another element, affected by an axial force as well as a torque.

3. The safety brake according to claim 1, wherein the switch mechanism's first torque-transmitting element comprises a screw-nut-based linear actuator, wherein a threaded nut forms part of a hub constituent in the centrifugal regulator, which surrounds the shaft, and wherein a screw acting as spindle is provided to part of the shaft periphery.

4. The safety brake according to claim 2, wherein the switch mechanism's second torque-transmitting element comprises one or a plurality of sling bodies that partake in the centrifugal regulator, which can be slung to engagement with an interior side, facing the shaft, of the first brake part.

5. The safety brake according to claim 4, wherein the sling bodies are sustained on the centrifugal regulator's hub.

6. The safety brake according to claim 1, wherein the first and the second brake part form part of a drum brake with parts concentrically engaged into each other, through which parts' concentric center the shaft extends.

7. The safety brake according to claim 6, wherein the first and the second brake part have annular slightly conical friction surfaces with an outer periphery and an inner periphery.

8. The safety brake according to claim 6, wherein the first brake part comprises a first and a second inner space, which viewed in axial direction are located on each side around a transverse wall, radially extending towards the shaft, in the brake part.

9. The safety brake according to claim 8, wherein the spring assembly is lodged in the said first space and the centrifugal regulator is lodged in the said second space.

10. The safety brake according to claim 9, comprising a first spring assembly and a second spring assembly through the action of which, by counter-acting spring forces, the first and the second brake parts are spring-biased against each other at a certain pressure force, whereby the centrifugal regulator is located between the said spring assembly and arranged to exert a pressure-relieving effect against the first brake part.

11. A centrifugal regulator comprising a shaft, a hub in which the shaft rotates, and one or a plurality of centrifugal bodies, which can be brought to torque-transmitting engagement with a rotatable part, wherein the centrifugal regulator comprises a switch mechanism operating between the shaft and the hub, which switch mechanism converts torque in the switch mechanism to a translation movement moving the hub and thereby the centrifugal regulator along the center-line of the shaft, wherein the translational movement is configured to move a first brake part away from a second brake part, until a balanced position is obtained, whereby both brake parts frictionally slide against each other.

12. The centrifugal regulator according to claim 11, wherein the switch mechanism comprises two interacting torque-transmitting elements, of which a first element is, under load caused by a torque on a second element, affected by an axial force as well as a torque, whereby the said axial force is converted into an axial translation movement for the centrifugal regulator along the shaft.

13. The centrifugal regulator according to claim 12, wherein the first torque-transmitting element comprises a screw-nut-based linear actuator, where a threaded nut forms part of the centrifugal regulator's hub, which surrounds the shaft, and where the screw acting as spindle is provided onto a part of the shaft-periphery.

14. Use of a centrifugal regulator according to claim 11 in a safety brake for an elevator, such as a direct part for adaptation of the safety brake to braking by affecting a rotatable brake part, which is comprised by the brake of the safety brake.

15. The centrifugal regulator of claim 11, wherein the rotatable part is a rotatable brake part in a safety brake.

* * * * *